US005560305A

United States Patent [19]
Yap

[11] Patent Number: 5,560,305
[45] Date of Patent: Oct. 1, 1996

[54] BURNER BLOCK AND METHOD FOR FURNACE

[75] Inventor: Loo T. Yap, Princeton, N.J.

[73] Assignee: The BOC Group, Inc., New Providence, N.J.

[21] Appl. No.: 356,087

[22] Filed: Dec. 15, 1994

[51] Int. Cl.$^6$ ....................................... F23D 1/00
[52] U.S. Cl. ...................... 110/347; 110/260; 110/104 B; 239/11; 432/24
[58] Field of Search ..................... 110/260, 261, 110/262, 263, 104 B, 104 R, 347; 432/19, 24; 239/11, 396, 461

[56] References Cited

U.S. PATENT DOCUMENTS

| 4,313,722 | 2/1982 | Yigdall | 432/1 |
|---|---|---|---|
| 4,986,748 | 1/1991 | Brown et al. | 431/188 |
| 5,242,110 | 9/1993 | Riley | 239/11 |
| 5,383,782 | 1/1995 | Yap | 431/159 X |
| 5,411,394 | 5/1995 | Beer et al. | 110/262 X |

Primary Examiner—Henry A. Bennett
Assistant Examiner—Susanne C. Tinker
Attorney, Agent, or Firm—David M. Rosenblum; Larry R. Cassett

[57] ABSTRACT

A burner block for mounting a burner within a furnace containing a melt to be heated by the burner. The burner block comprises a body having a passageway terminating in a divergent opening. The passageway is configured to receive the burner so that the burner is recessed within the divergent opening and a flame produced by the burner is directed out of the divergent opening and over the melt. The divergent opening has a lower section angled in a downward direction and the lower section has a reversed step to produce a primary recirculation zone beneath the flame, thereby to draw the flame in a downward direction toward the melt. The reversed step is positioned within the divergent opening so that when the burner is in use, a secondary recirculation zone forms between the opening and the melt and further draws the flame in the downward direction toward the melt. The height of this secondary recirculation zone will vary with the height of the melt within the furnace to produce a self adjustment of the flame toward the melt. In another aspect, the present invention relates to a furnace incorporating the aforesaid burner block, a burner positioned within the burner block and a melt.

7 Claims, 1 Drawing Sheet

BURNER BLOCK AND METHOD FOR FURNACE

BACKGROUND OF THE INVENTION the present invention relates to a burner block for mounting a burner within a furnace containing a melt. More particularly, the present invention relates to such a burner block in which primary and secondary recirculation zones are formed beneath a flame, emanating from the burner, to distort and displace the flame towards the melt. In another aspect, the present invention relates to a method of heating a melt within a furnace in which a flame produced by a burner is distorted and displaced towards the melt by primary and secondary recirculation zones located between the flame. In still another aspect, the present invention relates to the combination of the furnace, the melt, the burner and the burner block.

Melts, ferrous and non-ferrous, are heated within a furnace by burners designed to burn fuel in an oxidant, either air or oxygen enriched air or high purity oxygen. The melt is heated by a projected flame produced by the burner. As can be appreciated, heat is transferred not only to the melt, but also the ceiling of the furnace. In order to increase the heat transfer to the melt, it is known in the prior art to direct the projected flame towards the melt. For instance, in U.S. Pat. No. 4,909,733 a prior patent of the inventor herein, a burner or fuel jet is undershot by a rate enhancing gas consisting of oxygen or oxygen enriched air to produce combustion over a wide area and to draw the flame downwardly towards the melt by producing a low pressure field beneath the flame. In U.S. 5,199,867, also a prior patent of the inventor herein a burner is provided with a divergent, high momentum oxidant jet beneath a fuel jet to produce a fan-shaped divergent flame downwardly drown by the high velocity oxidant jet.

The foregoing patents are particularly desirable in glass furnaces and exhibit particularly desirable global combustion characteristics for all combustion applications. It is to be appreciated though that the direction of the flame in such patents cannot be dynamically adjusted in applications in which the level of the melt changes over time. As will be discussed, the present invention provides apparatus and methodology in which the degree to which the flame is displaced towards the melt is automatically adjusted to vary as the heat-accepting interface of the thermal load or melt varies.

SUMMARY OF THE INVENTION

The present invention provides a burner block for mounting a burner within a furnace containing a melt to be heated by the burner. The burner block comprises a body having a passageway terminating in a divergent opening to said furnace. The passageway is configured to receive the burner so that said burner is recessed within the divergent opening and a flame produced by said burner is directed out of said divergent opening and over the melt. The divergent opening has a lower section angled in a downward direction and the lower section has a reversed step to produce a primary recirculation zone beneath the flame, drawing said flame in the downward direction toward the melt. The reversed step is positioned within the divergent opening such that, when said burner is in use, a secondary recirculation zone forms between said divergent opening and the melt. This secondary recirculation zone further draws the flame in the downward direction and towards the melt.

In another aspect, the present invention provides a method of heating a melt within a furnace. In accordance with the method, a fuel is burned within a burner so that an outwardly projected flame is formed over the melt. A primary recirculation zone is formed beneath the flame and adjacent the burner so that the outwardly projected flame is drawn in a downward direction towards the melt. A secondary recirculation zone is formed between the flame of the melt and downstream of the primary recirculation zone so that the outwardly projected flame is further drawn in the downward direction and towards the melt.

In still another aspect, the present invention relates to a combination comprising a furnace, a melt located within the furnace, a burner for heating the melt, and a burner block for mounting the burner within the furnace. The burner block comprises a body having a passageway terminating in a divergent opening to said furnace. The passageway is configured to receive the burner so that said burner is recessed within the divergent opening and a flame produced by said burner is directed out of said divergent opening and over the melt. The divergent opening has a lower section angled in a downward direction and the lower section has a reversed step to produce a primary recirculation zone beneath the flame, drawing said flame in the downward direction toward the melt. The reversed step is positioned within the divergent opening such that, when said burner is in use, a secondary recirculation zone forms between said divergent opening and the melt. This secondary recirculation zone further draws the flame in the downward direction and towards the melt.

The formation of the secondary recirculation zone, automatically positions the flame with respect to the melt. The effectiveness of this secondary recirculation zone is enhanced due to the thin boundary layer created by the displacement and distortion of the flame as a result of the primary recirculation. As the level of the melt drops, since the secondary recirculation zone is always between the divergent opening and the melt, the flame further displaces and distorts so as to be closer to the melt than the ceiling of the furnace. The reverse operation occurs as the level of the melt rises. In fact the flame assumes an S-like configuration. As a result, more heat energy emanating from the flame is directed to the melt than to the roof of the furnace.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

DETAILED DESCRIPTION

Figure 2:
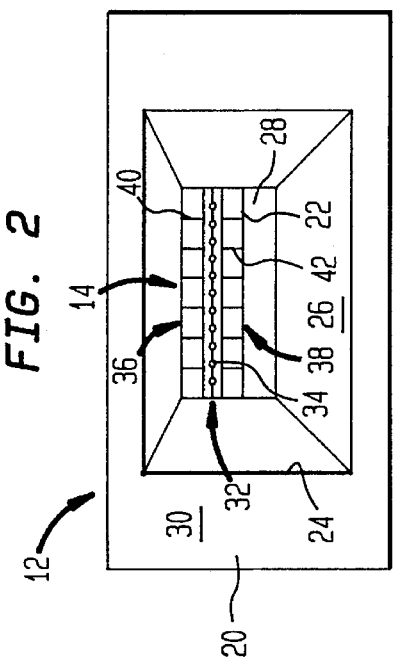
FIG. 2 is a front, elevational view of a burner block in accordance with the present invention.
Figure 1:
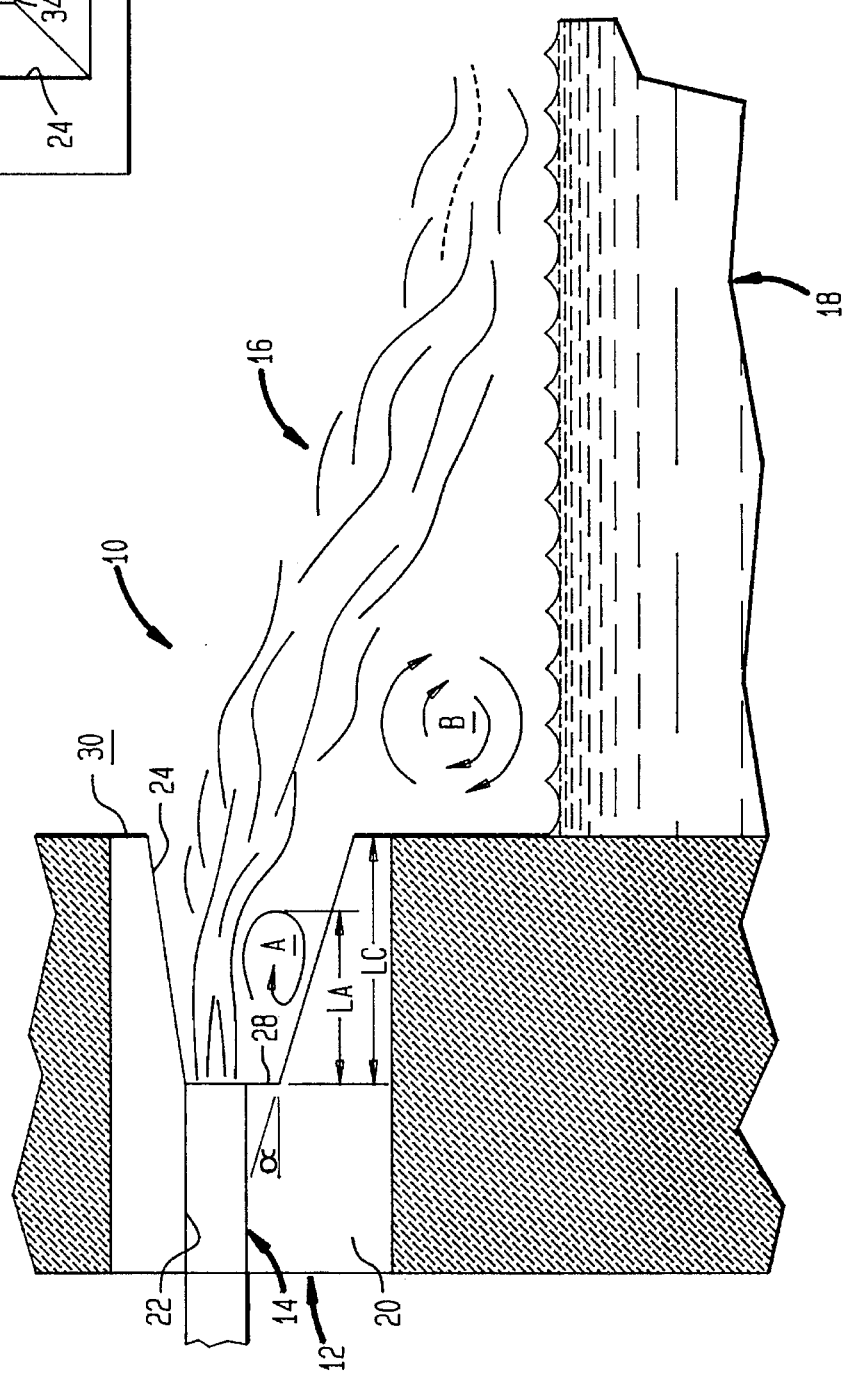
FIG. 1 is a fragmentary view of a furnace incorporating a burner block in accordance with the present invention with portions of the furnace and burner block cut away.

With reference to FIGS. 1 and 2, a furnace 10 incorporating a burner block 12 in accordance with the present invention is illustrated. Burner block 12 mounts a burner 14 for burning fuel so that a projected flame 16 is produced to heat a melt 18.

Burner block 12 has a body 20, which is preferably formed of a heat-resistant ceramic. Body 20 is provided with a passageway 22 terminating in a divergent opening 24.

Passageway 22 is configured to receive burner 14 so that burner 14 is recessed within divergent opening 24 and flame 16 is directed out of divergent opening 24 and over melt 18.

Divergent opening 24 has a lower section 26, angled in a downward direction, and a reversed step 28. Reversed step 28 produces a primary recirculation zone, designated by reference "A" in the drawings, that is located beneath the flame. In primary recirculation zone A, in the main, combustion products recirculate to produce a low pressure region to draw the flame in the downward direction and towards melt 18. Additionally, reversed step 28 is also positioned with respect to the outer terminus of divergent section 24, which in the illustrated embodiment is a front surface 30 of burner block 12, so that when burner 14 is in use, a secondary recirculation zone, designated by reference "B", forms between divergent opening 24 and melt 18. In secondary recirculation zone B, again, in the main combustion products recirculate to produce a further low pressure region to further draw flame 16 in the downward direction towards the melt. Since secondary recirculation zone B is always located between divergent opening 24 and the surface of melt 18, if the level of melt 18 drops, the height of secondary recirculation zone B will still act to draw flame 16 towards melt 18.

The effectiveness of the secondary recirculation zone B is enhanced by primary recirculation zone A. Essentially, primary recirculation allows for a thin boundary layer on lower section 26 resulting in clean separation of flow at the intersection of lower section 26 and front surface 30.

Preferably, reversed step 28 should be positioned behind front surface 30 at a distance, LC, equal to between about 2 and about 10 times a length, LA, of primary recirculation zone A. Even more preferably, distance LC should be between about 3 and about 4 times, length LA. This ensures the recirculation bubble is closed and no furnace atmosphere gas is transported towards the burner. Additionally, lower section 26 of divergent opening 24 should be between about 5° and about 40° from the axis of passageway 22. This angular relationship is given by $\alpha$ in FIG. 1. The placement of reversed step 28 and the downward angling of lower section 26 in the limits outlined above, for most cases, will produce secondary recirculation zone B due to the formation of a very thin boundary layer in divergent opening 24 that is located near outer surface 30 of burner block 12.

Burner 14, known oxy-fuel burner designed to burn a gaseous fuel in the presence of oxygen or oxygen enriched air. Burner 14 is fully described in U.S. Pat. No. 5,299,929, which is hereby incorporated by reference. Burner 14 has a central fuel nozzle 32 having apertures 34 which are outwardly directed to produce a fan-shaped, outwardly divergent fuel jet. Upper and lower oxidant nozzles 36 and 38 are provided with vanes 40 and 42, respectively, to produce fan-shaped, outwardly divergent oxidant jets. Burner 14 is designed to operate so that the oxidant jets are aspirated into the fuel due to their lower velocity and higher pressure than the central fuel jet produced by fuel nozzle 32.

Since burner 14 is of rectangular cross-section, passageway 22 and divergent opening 24 is also of rectangular configuration. It is understood though that the invention is not limited to any particular form of burner. Symmetric burners, having a central, circular fuel jet, surrounded by an annular-like oxidant jet or individual oxidant jets are equally applicable to the present invention. In such a circular burner case, divergent opening 24 would have a circular-like shape, or be conical.

In particular, the use of the disclosed technique for batch melt processes such as aluminum-containing melts where melt level can vary much is advantageous. As an example, the present invention has particular applicability to ceramic and non-ferous melts.

Although the invention has been described with reference to a preferred embodiment, it will be understood by those skilled in the art that numerous changes, omissions, and additions made be made without departing from the spirit and scope of the invention.

I claim:

1. A burner block for mounting a burner within a furnace containing a melt to be heated by said burner, said burner block comprising:

a body having a passageway terminating in a divergent opening to said furnace, said passageway configured to receive said burner so that said burner is recessed within said divergent opening and a flame produced by said burner is directed out of said divergent opening and over said melt;

said divergent opening having a lower section angled in a downward direction; and said lower section having a reversed step to produce a primary recirculation zone beneath said flame and above said lower section, drawing said flame in said downward direction toward said melt and said reversed step being positioned within said divergent opening such that, when said burner is in use, a secondary recirculation zone forms between said divergent opening and said melt, further drawing said flame in said downward direction toward said melt.

2. The burner block of claim 1, wherein:

said divergent opening is defined in a front surface of said burner block;

said primary recirculation zone has a length as measured from said reversed step; and said reversed step is located at a distance behind said front surface equal to between about 2 and 10 times said length of said primary recirculation zone.

3. The burner block of claim 1, wherein:

said divergent opening is defined in a front surface of said burner block;

said primary recirculation zone has a length as measured from said reversed step; and said reversed step is located at a distance behind said front surface equal to between about 3 and 4 times said length of said primary recirculation zone.

4. The burner block of claim 1, wherein said lower section of said divergent opening is angled downwardly between about 5 and about 40 degrees from said central axis of said passageway.

5. A method of heating a melt within a furnace comprising:

burning a fuel within a burner so that an outwardly projected flame is formed over said melt;

forming a primary recirculation zone beneath said flame and adjacent said burner so that said outwardly projected flame is drawn in a downward direction, toward said melt; and forming a secondary recirculation zone between said flame and said melt and downstream of said primary recirculation zone so that said outwardly projected flame is further drawn in said downward direction and toward said melt.

6. A combination comprising:

a furnace;

a melt located within said furnace;

a burner for heating said melt; mad a burner block for mounting said burner within said furnace, said burner block comprising:

a body having a passageway terminating in a divergent opening to said furnace, said passageway configured to receive said burner so that said burner is recessed within said divergent opening and a flame produced by said burner is directed out of said divergent opening and over said melt;

said divergent opening having a lower section angled in a downward direction; and said lower section having a reversed step to produce primary recirculation zone beneath said flame and above said lower section, drawing said flame in said downward direction toward said melt and said reversed step being positioned within said divergent opening such that, when said burner is in use, a secondary recirculation zone forms between said divergent opening and said melt, further drawing said flame in said downward direction toward said melt.

7. The combination of claim 6, wherein said melt comprises aluminum.

* * * * *